(12) United States Patent
Dahlquist et al.

(10) Patent No.: US 8,794,189 B1
(45) Date of Patent: Aug. 5, 2014

(54) CLEANING GLOVE WITH SELECTIVE WATER ACTUATOR

(71) Applicant: Season 4, LLC, Charlotte, NC (US)

(72) Inventors: Kevin James Dahlquist, Charlotte, NC (US); Thomas James Philpott, Charlotte, NC (US); Daniel Lee Bizzell, Charlotte, NC (US); Michael Starkey, Charlotte, NC (US); Daniel Lentz, Blacksburg, VA (US)

(73) Assignee: Season 4, LLC, Charlotte, NC (US)

( * ) Notice: Subject to any disclaimer, the term of this patent is extended or adjusted under 35 U.S.C. 154(b) by 149 days.

(21) Appl. No.: 13/684,144

(22) Filed: Nov. 21, 2012

Related U.S. Application Data

(63) Continuation of application No. 13/607,661, filed on Sep. 7, 2012, now abandoned, which is a continuation of application No. 13/481,823, filed on May 26, 2012, now abandoned.

(60) Provisional application No. 61/569,242, filed on Dec. 10, 2011.

(51) Int. Cl.
*A01K 29/00* (2006.01)
*A01K 13/00* (2006.01)

(52) U.S. Cl.
CPC .................................... *A01K 13/001* (2013.01)
USPC ............................... 119/665; 401/7; 119/650

(58) Field of Classification Search
CPC ......... A47L 13/18; A47L 1/08; A01K 13/001
USPC .................. 119/665, 652, 664, 650; 222/175; 401/6–8

See application file for complete search history.

(56) References Cited

U.S. PATENT DOCUMENTS

| | | | | | |
|---|---|---|---|---|---|
| 1,530,327 | A | * | 3/1925 | Redlick | 401/7 |
| 1,533,732 | A | * | 4/1925 | Frost | 239/529 |
| 1,534,208 | A | * | 4/1925 | Gibson | 239/288 |
| 5,303,847 | A | * | 4/1994 | Cottone | 222/78 |
| 5,722,349 | A | * | 3/1998 | Wolgamuth | 119/665 |
| 6,109,214 | A | * | 8/2000 | Rampersad | 119/600 |
| 7,478,768 | B2 | * | 1/2009 | Yip | 239/529 |
| 7,568,639 | B2 | * | 8/2009 | Yip | 239/529 |
| 8,167,177 | B1 | * | 5/2012 | Galgano | 222/175 |
| 8,286,592 | B2 | * | 10/2012 | Moinester | 119/652 |

* cited by examiner

*Primary Examiner* — Kristen C Hayes
(74) *Attorney, Agent, or Firm* — Tillman Wright, PLLC; Chad D. Tillman; Jeremy C. Doerre

(57) ABSTRACT

A washing glove includes a sheath designed to be pulled onto the hand and extend along a portion of the forearm, and includes at least one thumb opening for extension of the thumb there through and at least one finger opening at a distal end of the sheath for extension of one or more fingers therethrough. The glove also includes a section of protuberances with openings in-between and around various protuberances for flow of water onto a pet being washed while the pet is scrubbed via the protuberances; and an actuator for selectively actuating flow of the water to and through the openings in the section of protuberances. The section is located in an area for covering a palm of the hand, adjacent the thumb opening, and the actuator is located at a proximal end of the sheath in an area for covering a portion of a forearm.

12 Claims, 16 Drawing Sheets

CLEANING GLOVE WITH SELECTIVE WATER ACTUATOR

CROSS-REFERENCE TO RELATED APPLICATION

The present application is a U.S. continuation patent application of, and claims priority under 35 U.S.C. §120 to, U.S. nonprovisional patent application Ser. No. 13/607,661, filed Sep. 7, 2012, which '661 application is a continuation patent application of, and claims priority under 35 U.S.C. §120 to, U.S. nonprovisional patent application Ser. No. 13/481,823, filed May 26, 2012, which '823 application is a U.S. nonprovisional patent application of, and claims priority under 35 U.S.C. §119(e) to, U.S. provisional patent application No. 61/569,242, filed Dec. 10, 2011; and which '661 application further is a U.S. nonprovisional patent application of, and claims priority under 35 U.S.C. §119(e) to, U.S. provisional patent application No. 61/569,242, filed Dec. 10, 2011. The present application also is a U.S. nonprovisional patent application of, and claims priority under 35 U.S.C. §119(e) to, U.S. provisional patent application No. 61/569,242, filed Dec. 10, 2011. Each of the foregoing patent applications from which priority is claimed herein, and any application publication thereof and patent issuing therefrom, is incorporated herein by reference. Moreover, the disclosure of '823 and '242 patent applications are contained in the Appendix to the Specification, which is incorporated herein by reference.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The present invention generally relates to washing apparatus and methods and, more particularly, relates a washing glove for washing a pet, e.g., a dog, with a selectably actuated valve for dispensing a fluid.

Washing an animal can be a burdensome process. Animals generally do not enjoy being cleaned and can try to escape a worker's grasp while being washed with a hose or a shower head. Also, turning the hose on and off can be inconvenient for the washer.

Several washing apparatus and methods are disclosed in the patent literature. For example, apparatus including a glove is disclosed in U.S. Pat. No. 5,722,349 to Wolgamuth; U.S. Pat. No. 2,663,890 to Sullins; and U.S. Pat. No. 836,181 to Cray. A hand-held device is disclosed U.S. Pat. No. 5,048,759 to Mazziotta.

Washing apparatus and methods in accordance with one or more aspects and features of the present invention are believed to represent improvements to the washing apparatus and methods of these references.

SUMMARY OF THE INVENTION

The present invention includes many aspects and features, many of which are disclosed in the drawings, described below.

Additionally, in an aspect of the invention, a washing glove includes a sheath designed to be pulled onto the hand and extent along a portion of the forearm, the sheath having at least one thumb opening for extension of the thumb there through and at least one finger opening at a distal end of the sheath for extension of at least one finger therethrough; at least one section of protuberances, the section including openings located in-between and around various protuberances for flow of water onto a pet being washed; and an actuator for selectively actuating flow of water to and through the openings in the section of protuberances. actuator for selectively actuating flow of water to and through the openings in the section of protuberances.

In a feature of this aspect, the sheath includes an area extending between the actuator and the section of protuberances that is designed to cover the wrist and permit flexibility of the hand at the wrist.

In a feature of this aspect, one or more tubes are embedded in the sheath and extend between the actuator and the section of protuberances for flow of water therebetween.

In a feature of this aspect, one or more tubes are located on an underside of the sheath and extend between the actuator and the section of protuberances for flow of water therebetween.

In a feature of this aspect, an externally located bridge spans the area between the actuator and the section of protuberances and defines a conduit through which water flows therebetween. It will be appreciated that, when the washing glove is worn, the bridge spans the area of the wrist of the wearer.

Another aspect comprises a method of using such washing apparatus in accordance with any of the foregoing aspects.

Another aspect comprises making washing apparatus in accordance with any of the foregoing aspects.

Various aspects and features of the present invention are believed to be improvements over the washing apparatus and methods disclosed in U.S. patent application Ser. No. 61/569, 242, which is incorporated herein by reference. Accordingly, such apparatus and methods with modifications so as to include one or more aspects or features disclosed herein are, in fact, considered to be embodiments of the present invention.

In addition to the aforementioned aspects and features of the present invention, it should be noted that the present invention further encompasses the various possible combinations and subcombinations of such aspects and features. Thus, for example, any aspect may be combined with an aforementioned feature in accordance with the present invention without requiring any other aspect or feature.

BRIEF DESCRIPTION OF THE DRAWINGS

One or more preferred embodiments of the present invention now will be described in detail with reference to the accompanying drawings, wherein the same elements are identified with the same callout references.

DETAILED DESCRIPTION

Figure 1:
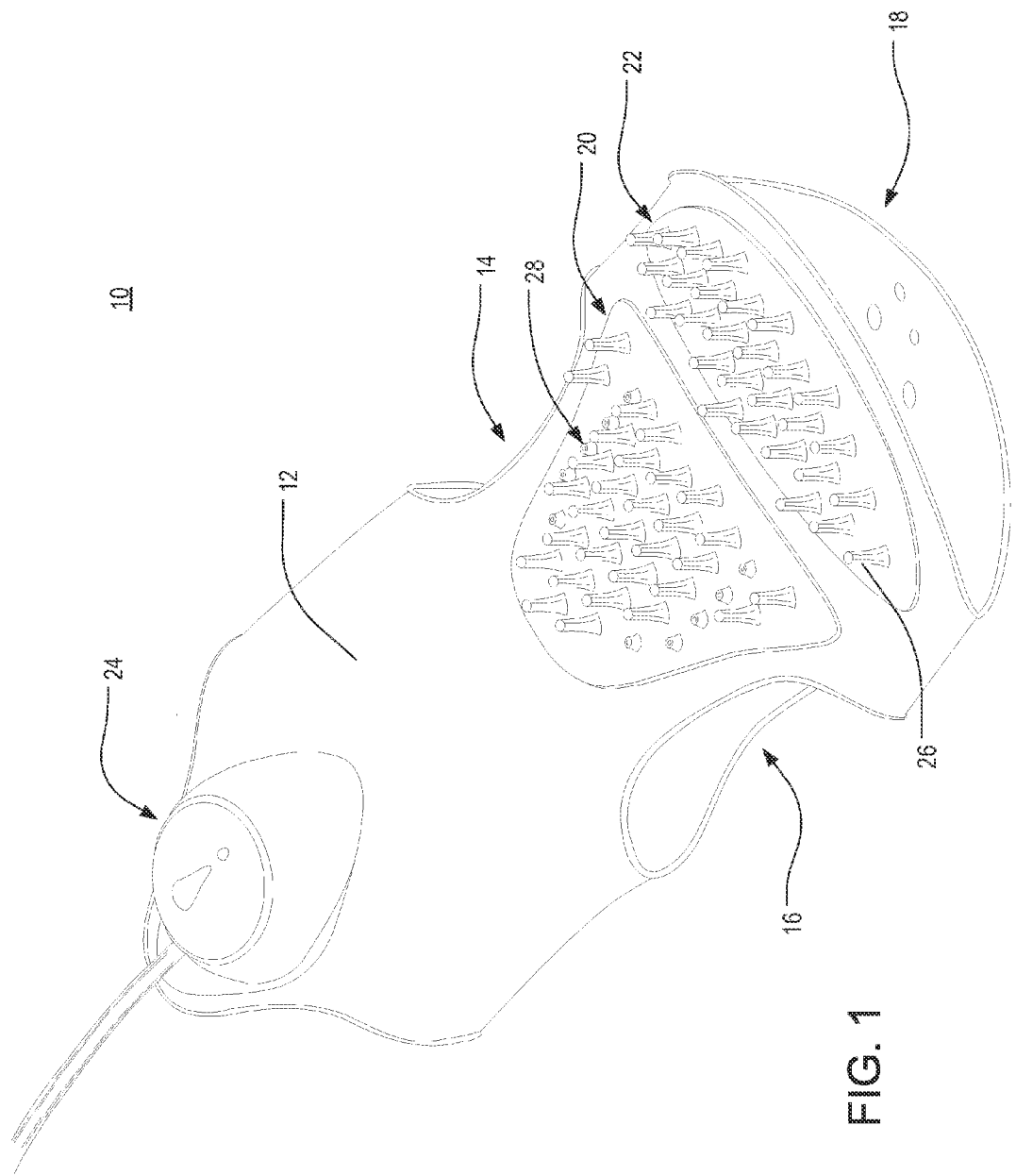
FIG. 1 illustrates a perspective view of a bottom of a preferred washing glove, in accordance with one or more aspects and features of the present invention, from the perspective of a user wearing the washing glove with his or her palm facing up.

As a preliminary matter, it will readily be understood by one having ordinary skill in the relevant art ("Ordinary Artisan") that the present invention has broad utility and application. As should be understood, any embodiment may incorporate only one or a plurality of the above-disclosed aspects of the invention and may further incorporate only one or a plurality of the above-disclosed features. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. §112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, one or more preferred embodiments of the present invention are next described. The following description of one or more preferred embodiments is merely exemplary in nature and is in no way intended to limit the invention, its implementations, or uses.

Figure 2:
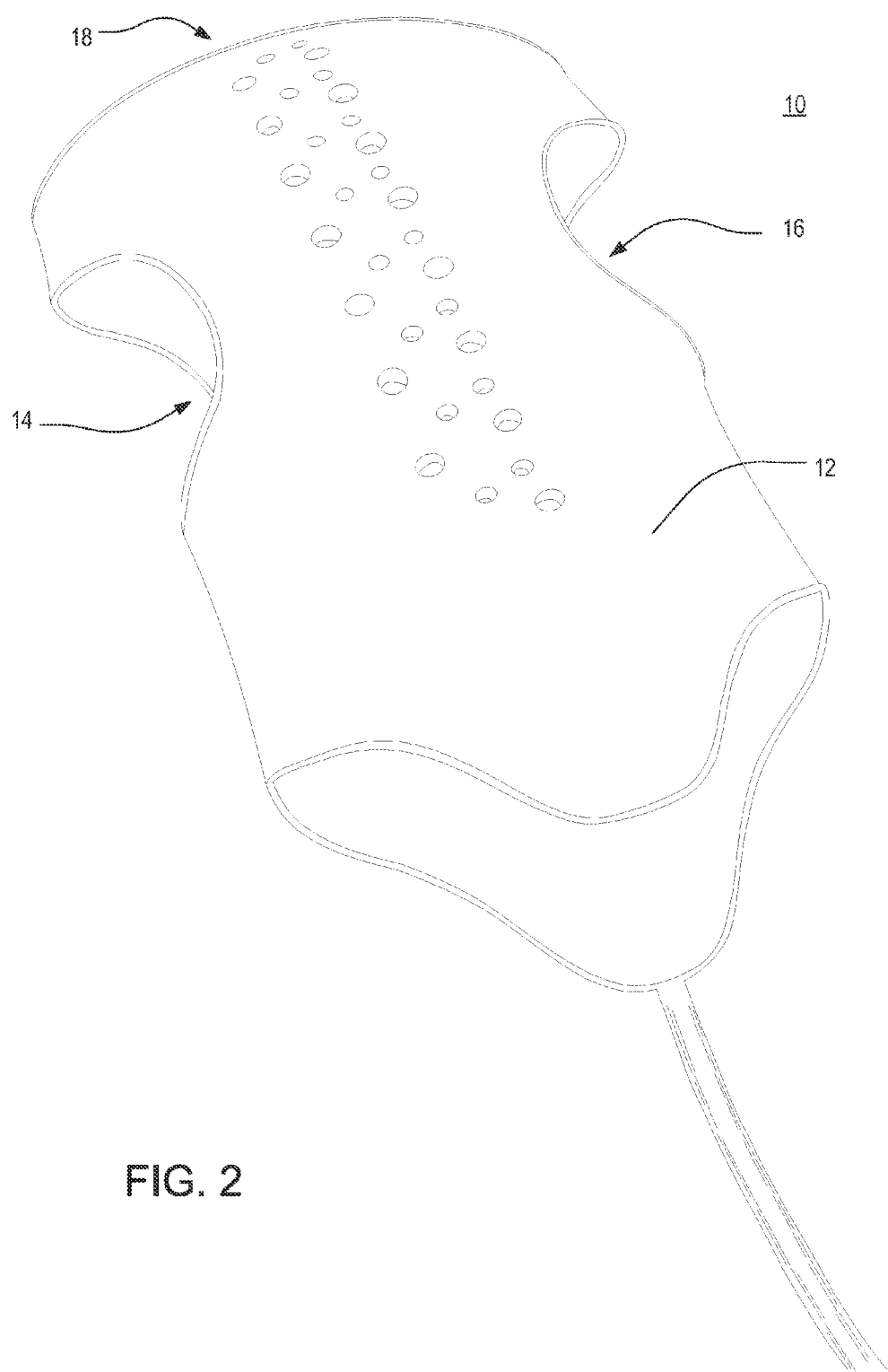
FIG. 2 illustrates a perspective view of a top of the preferred washing glove of FIG. 1 from the perspective of a user wearing the washing glove with his or her hand facing down.
Figure 3:
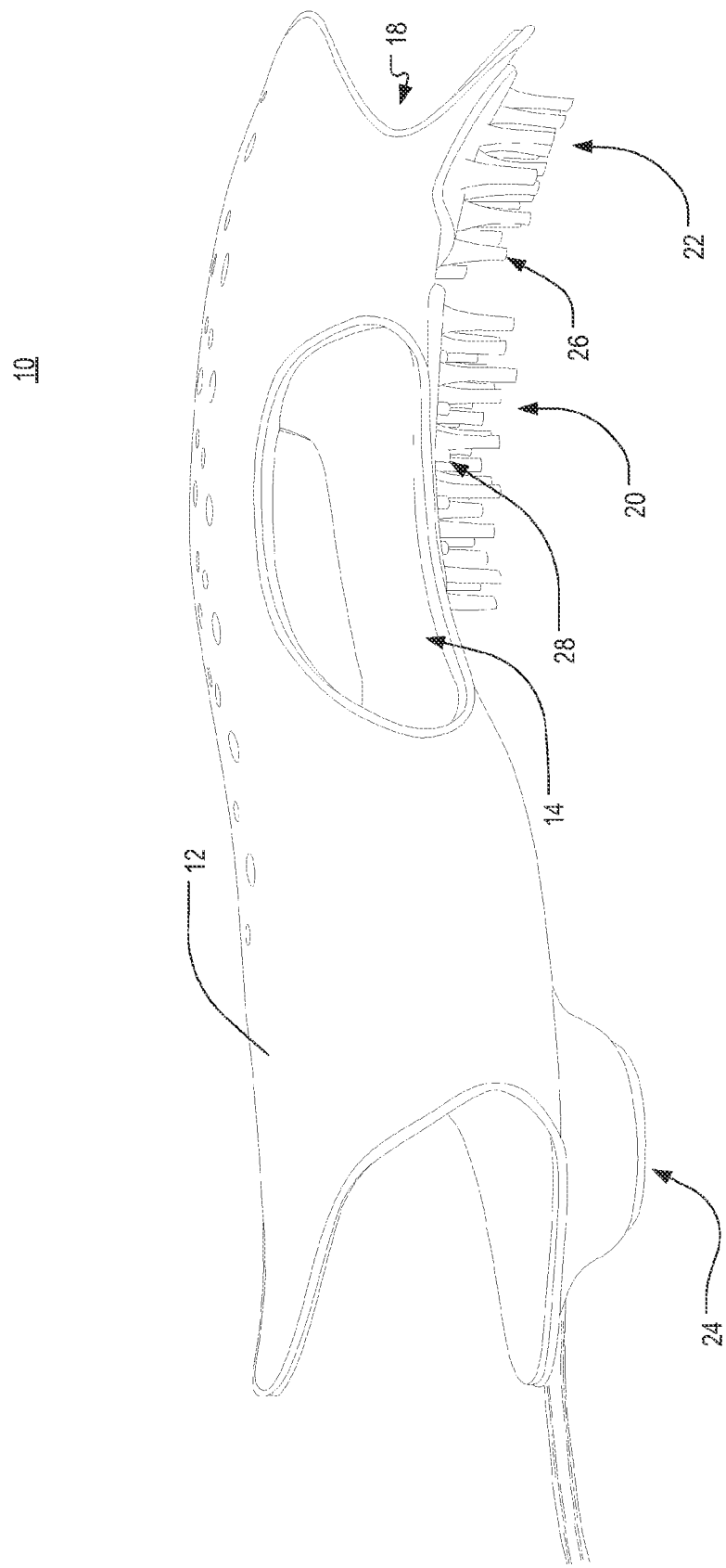
FIG. 3 illustrates a side elevational view of the preferred washing glove of FIG. 1.

With reference to FIGS. 1-3, a preferred washing glove 10 is illustrated. The washing glove 10 comprises a sheath 12 preferably made of neoprene or other similar material. The material also may comprise an elastic or stretchable material such that the glove 10 fits most hands. The sheath 12 is designed to be pulled onto the hand and extend along a portion of the forearm. Thumb openings 14,16 are provided for extension of the thumb, and finger openings 18 at a distal end of the sheath 12 are provided for extension of the fingers. Thumb opening 14 is designed to accommodate extension of the thumb of the right hand therethrough, and thumb opening 16 is designed to accommodate extension of the thumb of the left hand therethrough. Accordingly, the washing glove 10 can be worn on either the left hand or the right hand as desired by a user.

The washing glove 10 also includes protuberances 26 (also sometimes called scrubbers) and specifically, as shown in FIG. 1, two sections 20,22 of protuberances. The protuberances assist in washing fur of a pet. Openings 28 are provided in section 20 in-between and around various protuberances for flow of water onto the pet being washed.

The washing glove 10 further includes an actuator 24 for selectively actuating flow of the water. One or more tubes or conduits (not shown) embedded in the sheath 12, or located on an underside of the sheath 12, carry water from the actuator 24 to section 20, whereat the water is dispensed through the openings 28. It will be appreciated from the drawings that water is not transported to and dispensed through any openings in section 22 in the washing glove 10.

As will be evident from the drawings, section 20 is located in the area proximate the palm of the hand, in-between the thumb openings 14,16; section 22 is located in the area proximate the fingers between section 22 and opening 18; and actuator 24 is located at the proximal end of the sheath 12 in an area designed to cover a portion of a forearm. Moreover, the sheath includes a sufficient area extending between the actuator 24 and section 20 that is designed to bridge the wrist and permit flexibility of the hand at the wrist. Similarly, the sheath includes a sufficient area extending between the section 20 and section 22 that is designed to permit hinging of the fingers relative to the palm.

Figure 4:
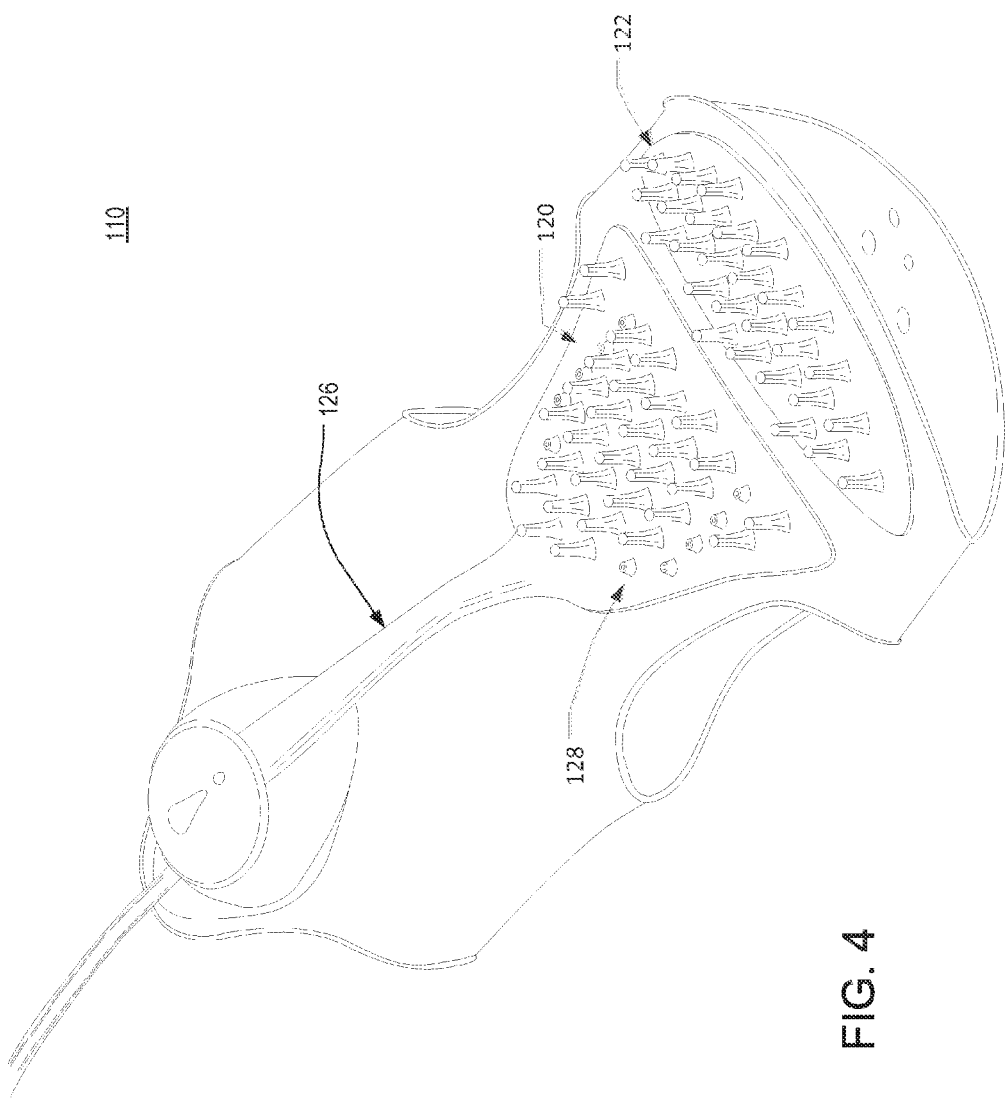
FIG. 4 illustrates a perspective view of a bottom of another preferred washing glove, in accordance with one or more aspects and features of the present invention, from the perspective of a user wearing the washing glove with his or her palm facing up.

A second preferred washing glove 110 is illustrated in FIG. 4 and is similar in design and structure to the washing glove 10. One difference is that rather than include tubes or conduits embedded in the sheath, or located on an underside of the sheath, that carry water from the actuator to the section of protuberances, an externally located bridge 126 spans the area between the actuator and the section of protuberances which bridge 126 defines a conduit through which the water flows therebetween. Furthermore, it will be appreciated from the drawings that water is not transported to and dispensed through any openings in section 122 in the washing glove 110. Like in washing glove 10, water is transported to section 120 and dispensed through openings 128 formed therein.

Figure 5:
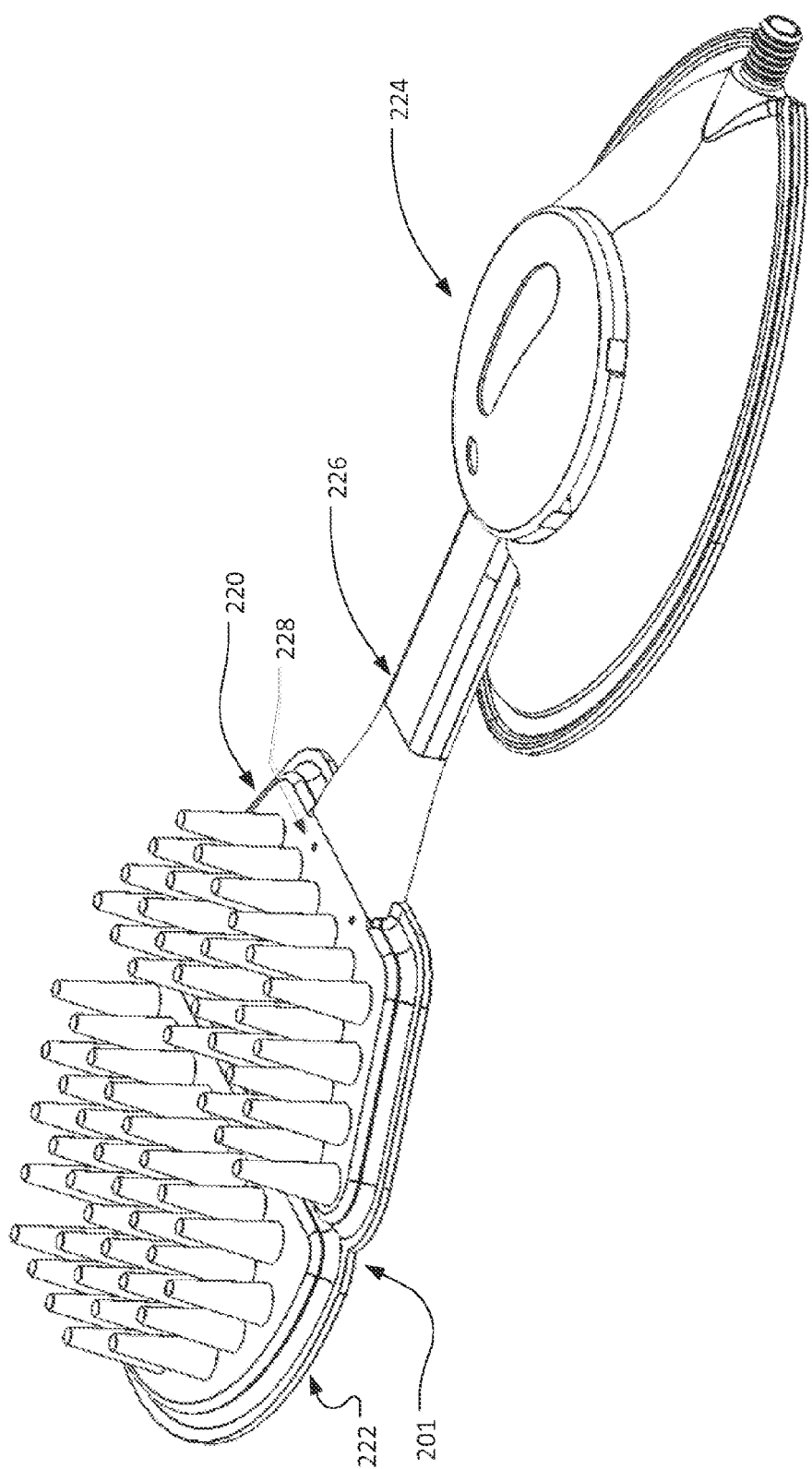
FIG. 5 illustrates a perspective view of components of a preferred washing glove similar to the washing glove of FIG. 4.

FIG. 5 illustrates components of a preferred washing glove similar to the washing glove 110 of FIG. 4. The omitted sheath is nonetheless similar those shown in FIGS. 1-4. A primary difference in the components of the washing glove of FIG. 4 and those represented in FIG. 5 is that the two sections of protuberances 220, 222 are integral with each other and are joined by a weakened line of material along hinge as shown in FIG. 5 at 201. Conduits for water flow are also defined in the material that extend across this hinge so that, upon selectively actuating the actuator 224, water flows through the bridge 226 into a water chamber of the first section 220, and from there flows not only through openings 228 in the first section 220 (two representative openings of which are illustrated in FIG. 5), but also flows from there into the second section 222 of protuberances and through openings defined therein between and around the protuberances of the second section 222.

Figure 6:
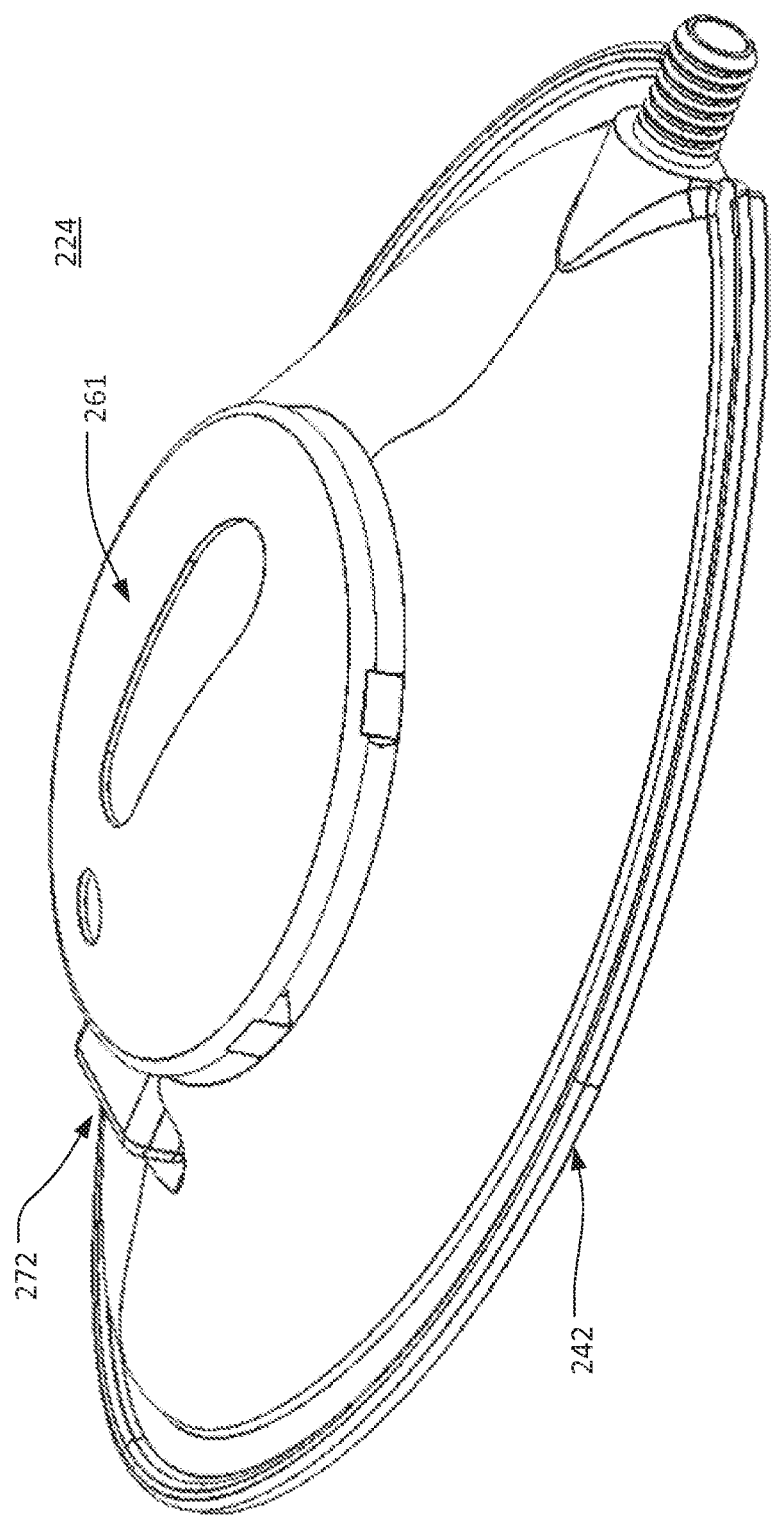
FIG. 6 illustrates a perspective view of a subset of the components of FIG. 5.

FIG. 6 illustrates the subset actuator components of FIG. 5. The actuator 224 includes a rim 242 for sheath securement. The actuator also includes a pressable top portion or button component 261 for selectively actuating or deactivating the flow of the water through port 272 and into and through the bridge 226 (shown in FIG. 5) for transport to the first section 220 of protuberances.

Figure 7:
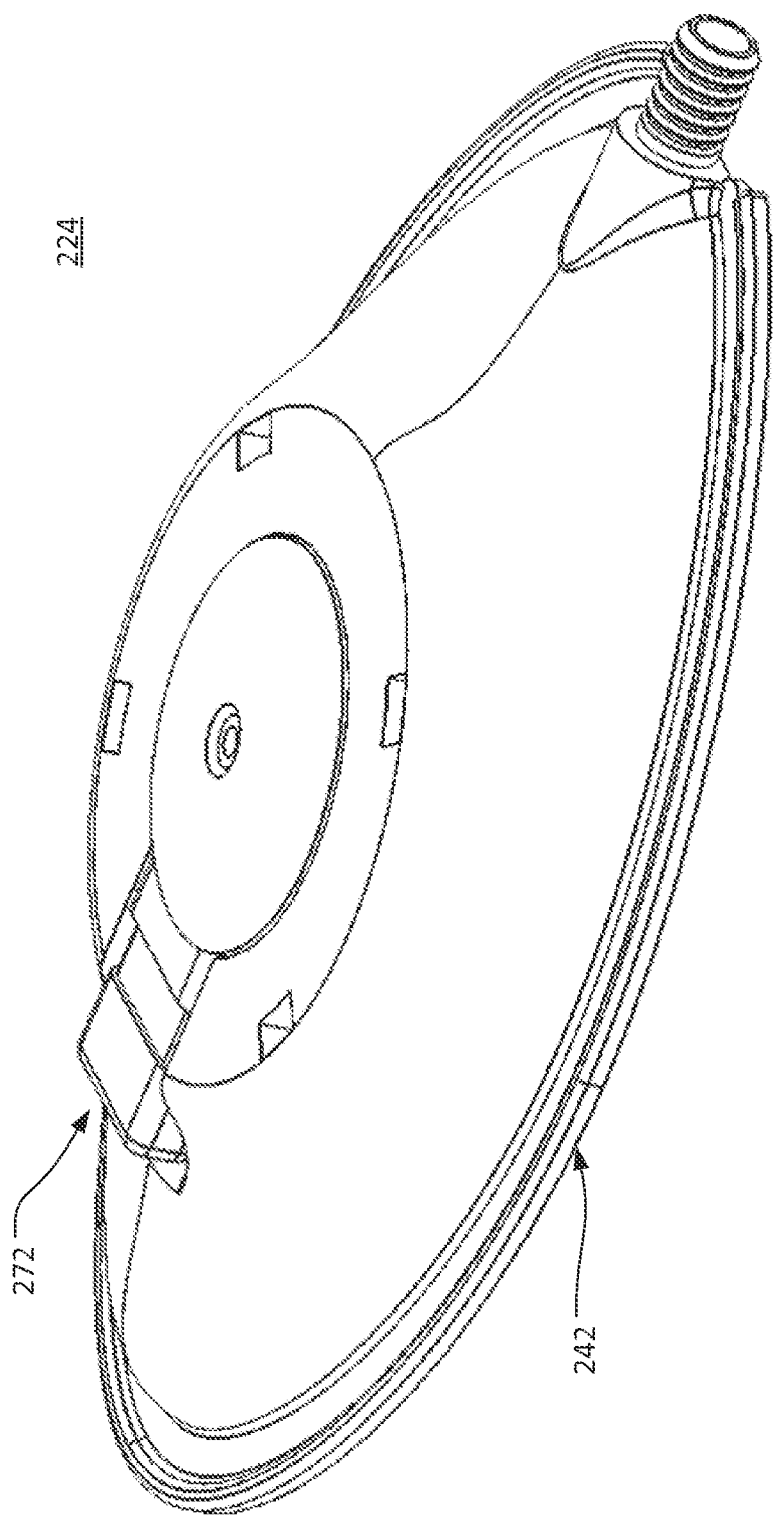
FIG. 7 illustrates a perspective view of a subset of the components of FIG. 6.
Figure 8:
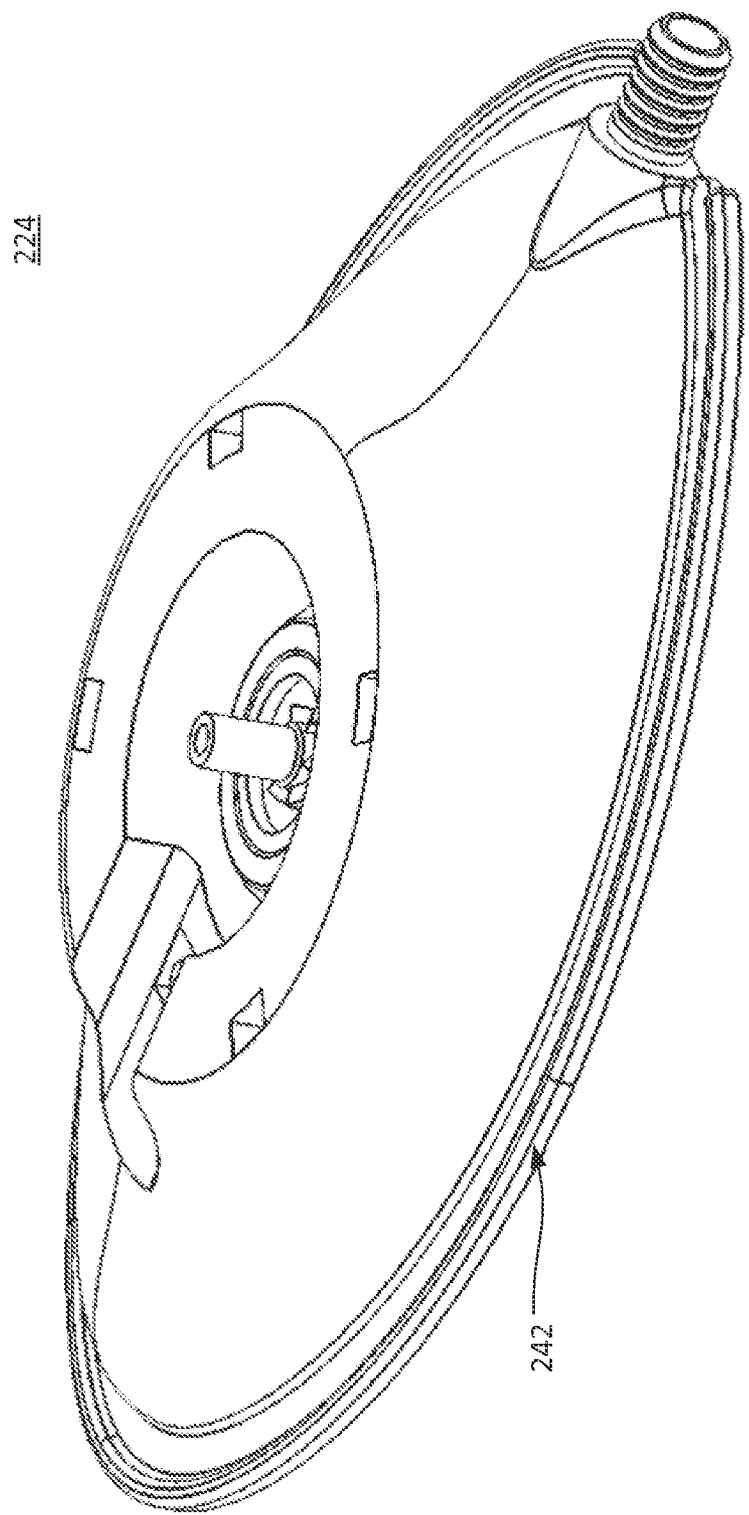
FIG. 8 illustrates a perspective view of a subset of the components of FIG. 7.
Figure 9:
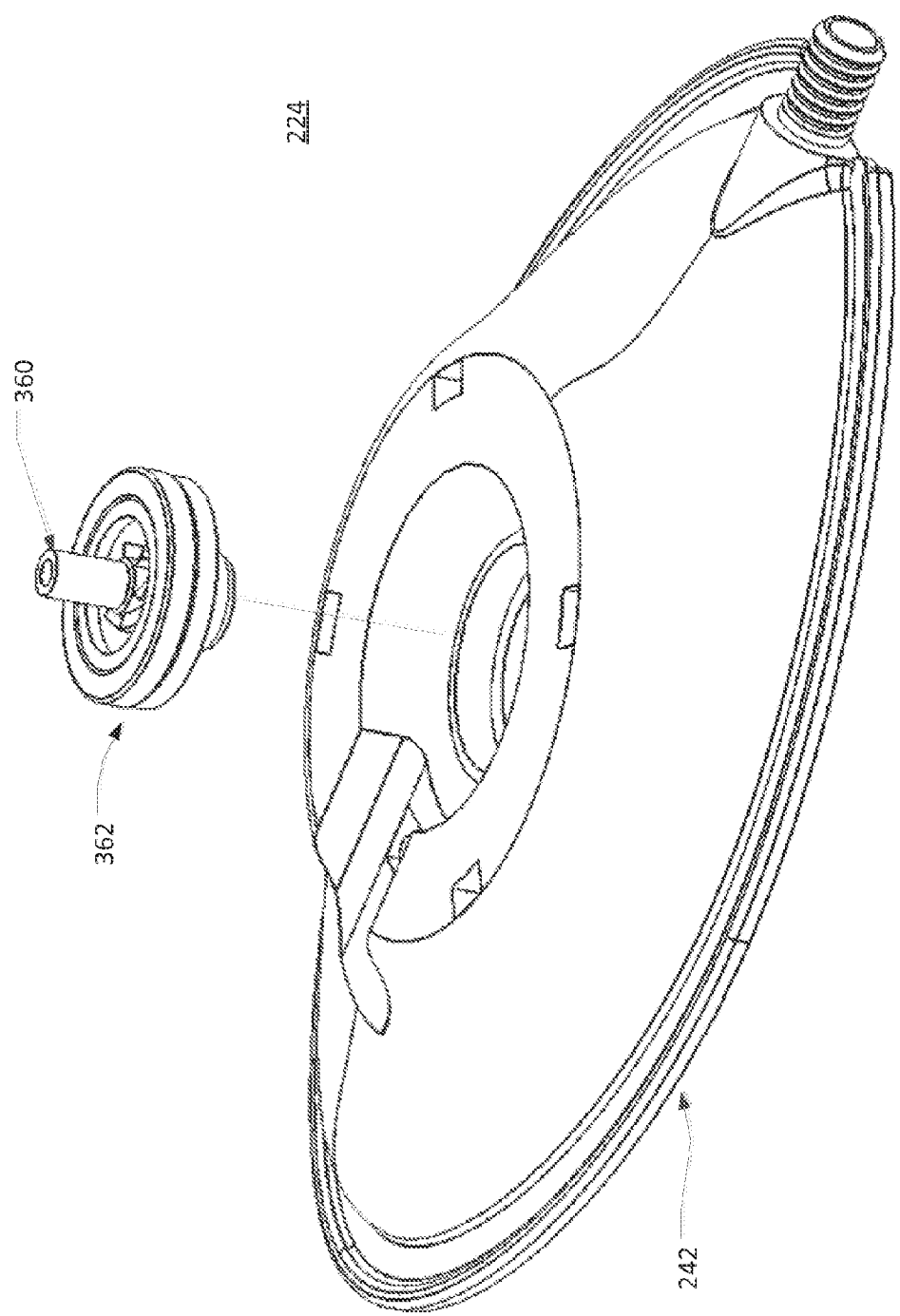
FIG. 9 illustrates a perspective view of a subset of the components of FIG. 8.
Figure 10:
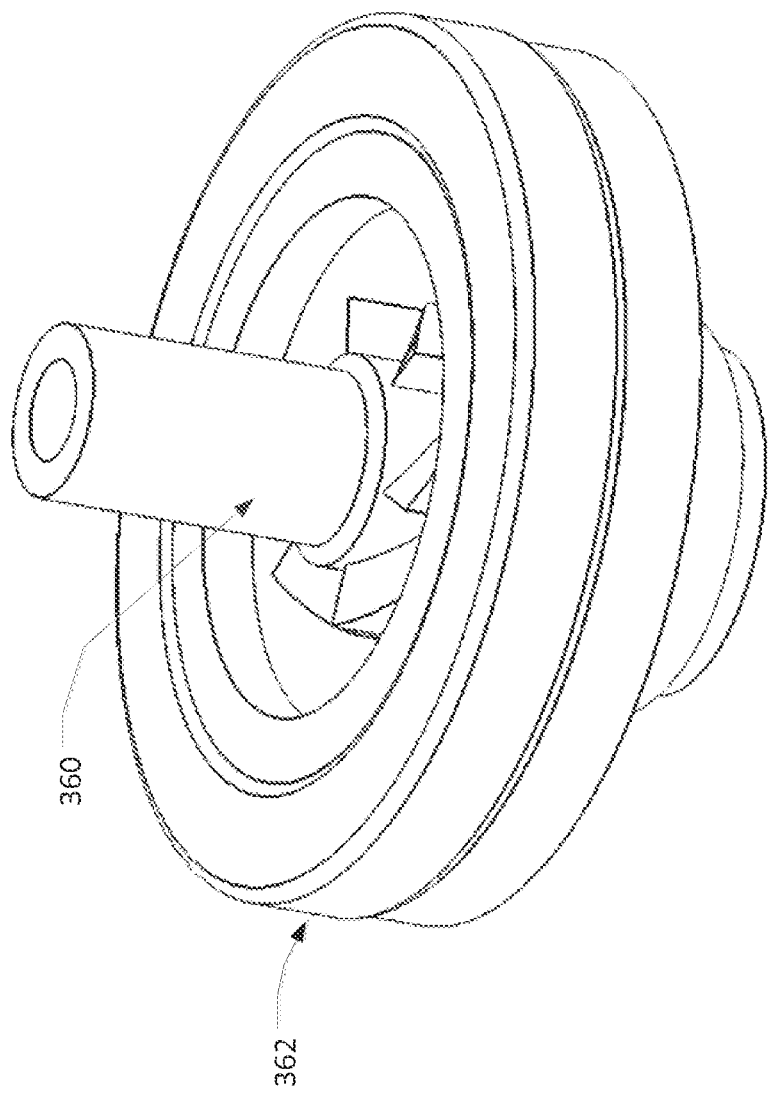
FIG. 10 illustrates a perspective view of a subset of the components of FIG. 9.
Figure 11:
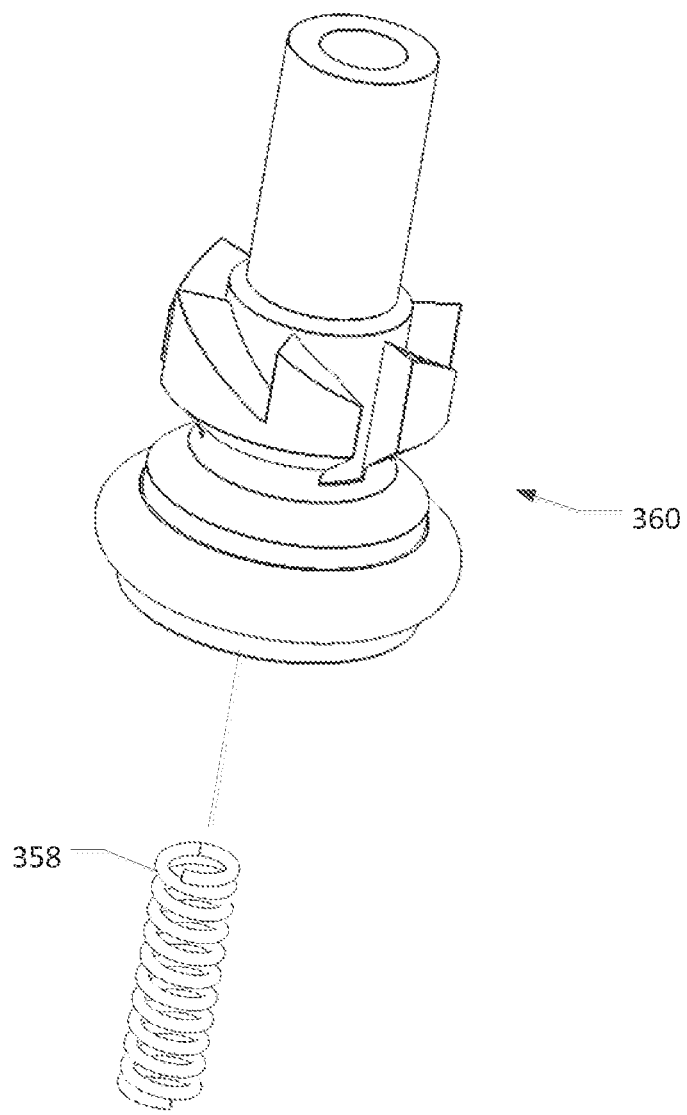
FIG. 11 illustrates a partially exploded view of the components of FIG. 10.
Figure 12:
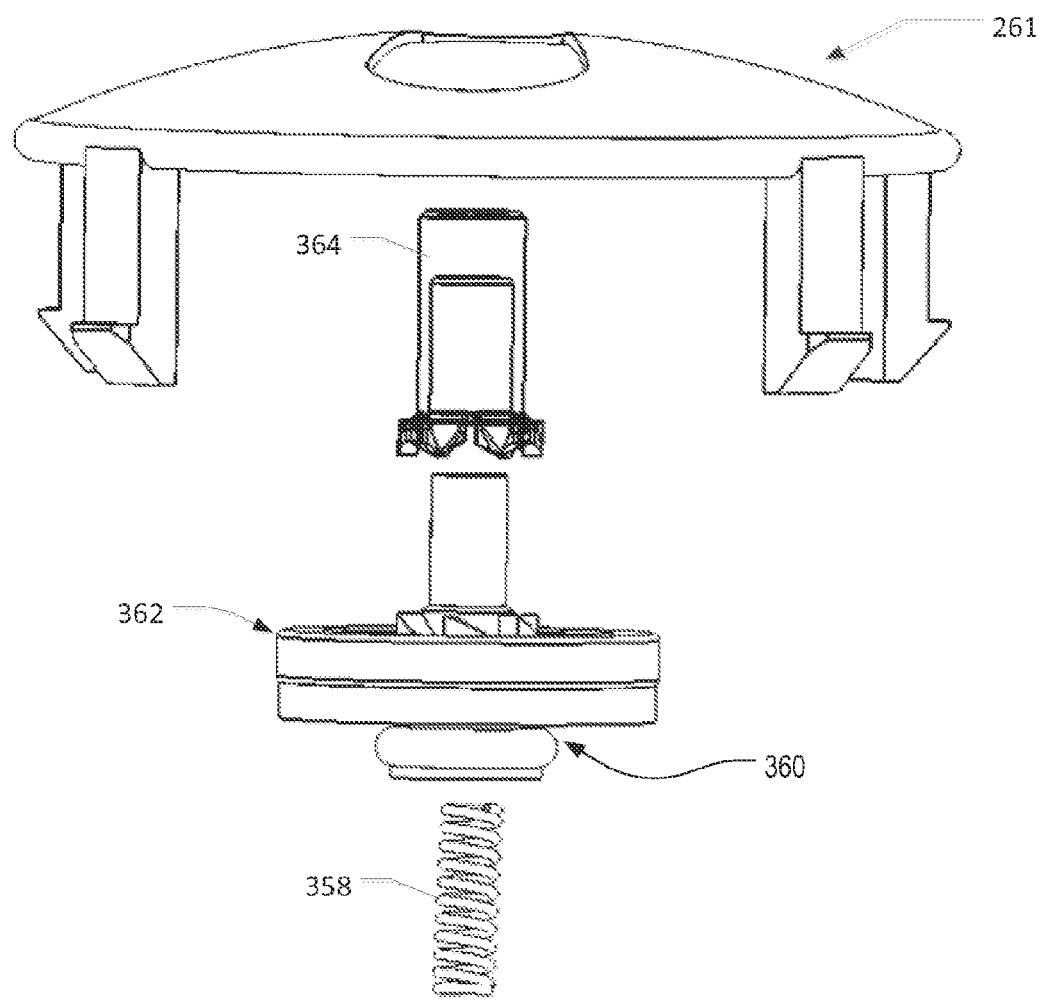
FIG. 12 illustrates a partially exploded side elevational view of components of a preferred washing glove when the seal component is in the open position.
Figure 13:
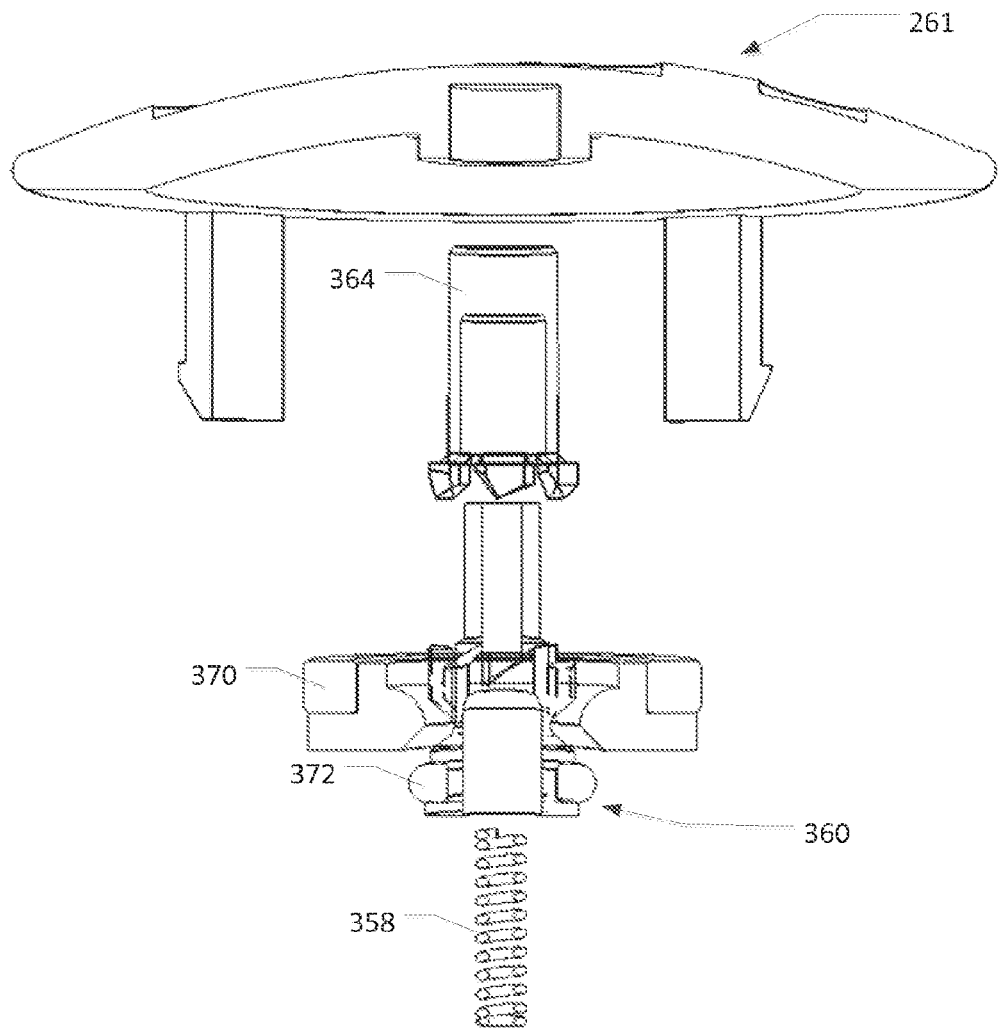
FIG. 13 illustrates in cross-section the components of FIG. 12 but viewed from the opposite side.
Figure 14:
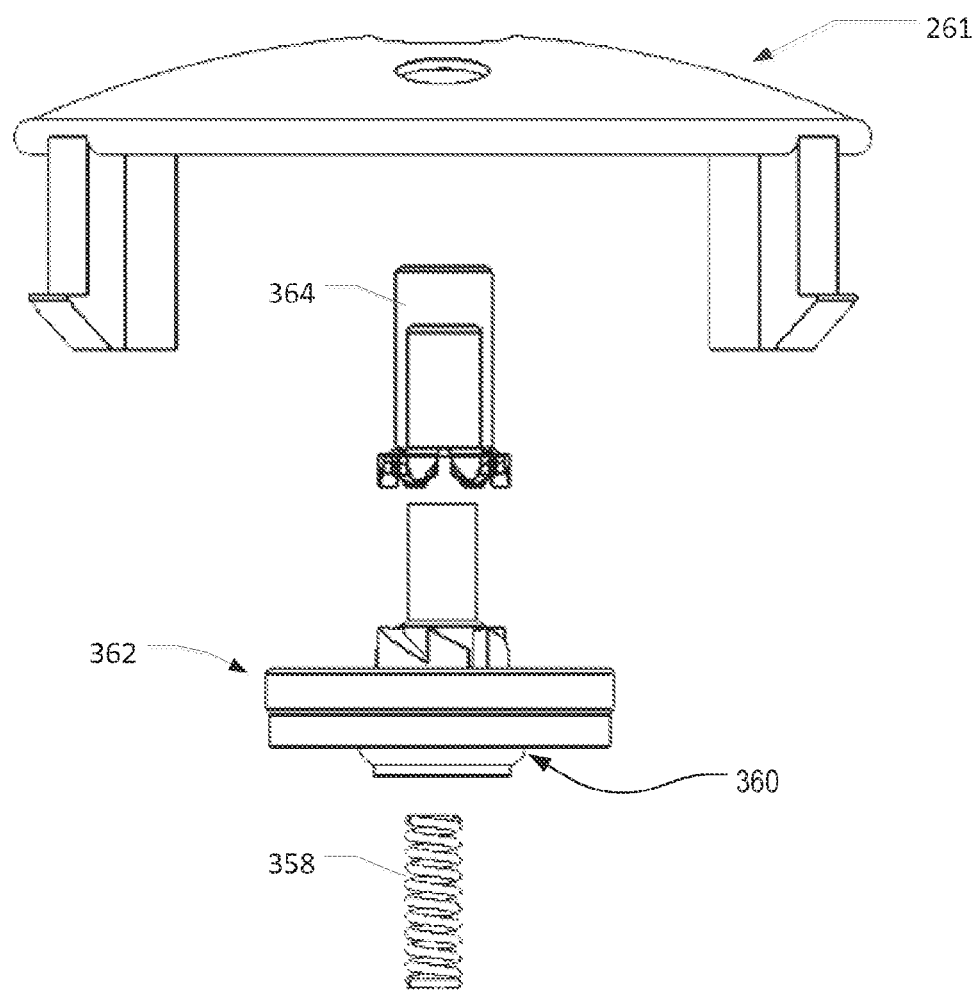
FIG. 14 illustrates a partially exploded side elevational view of components of a preferred washing glove when the seal component is in the closed position.
Figure 15:
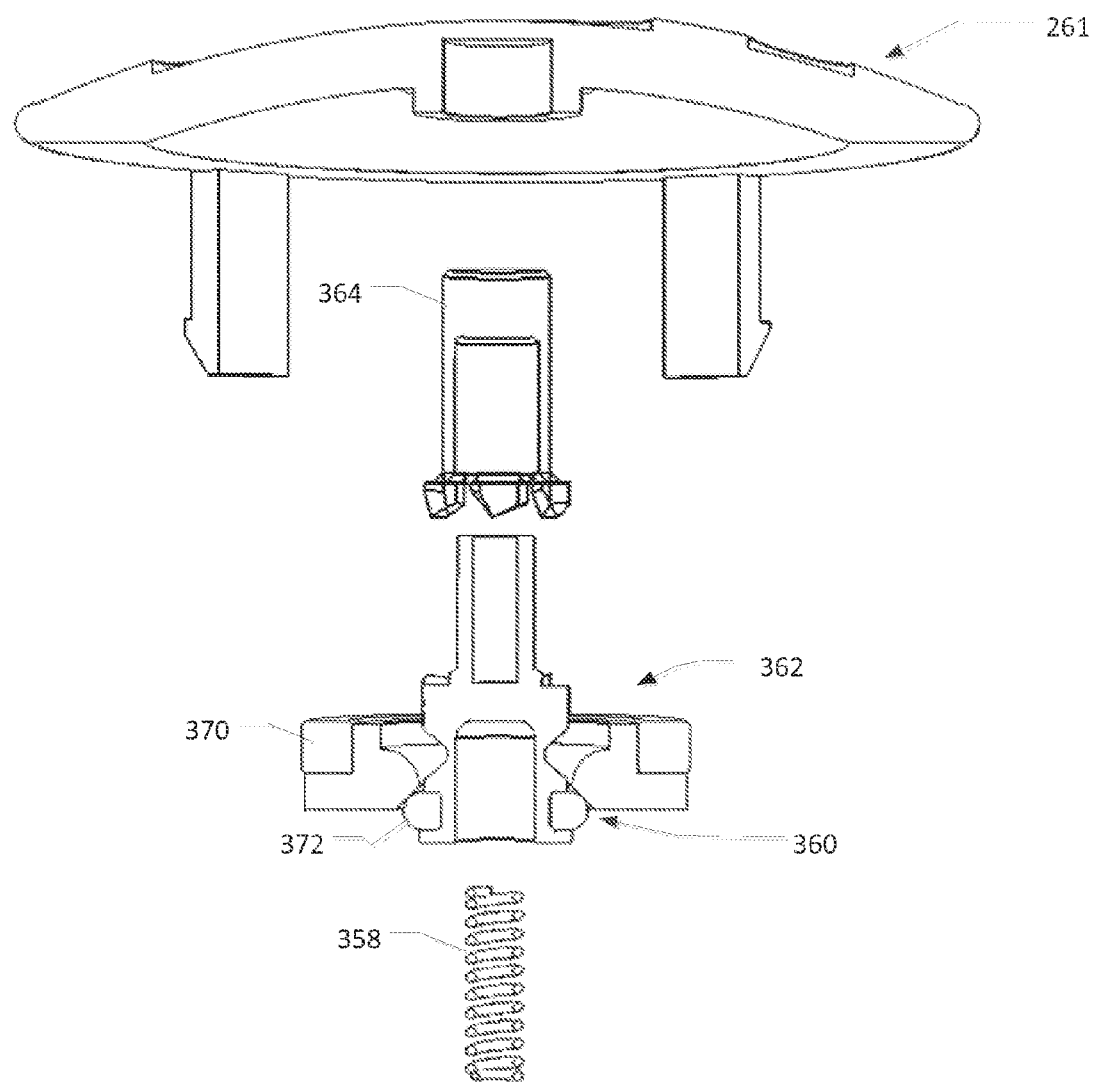
FIG. 15 illustrates in cross-section the components of FIG. 12 but viewed from the opposite side.
Figure 16:
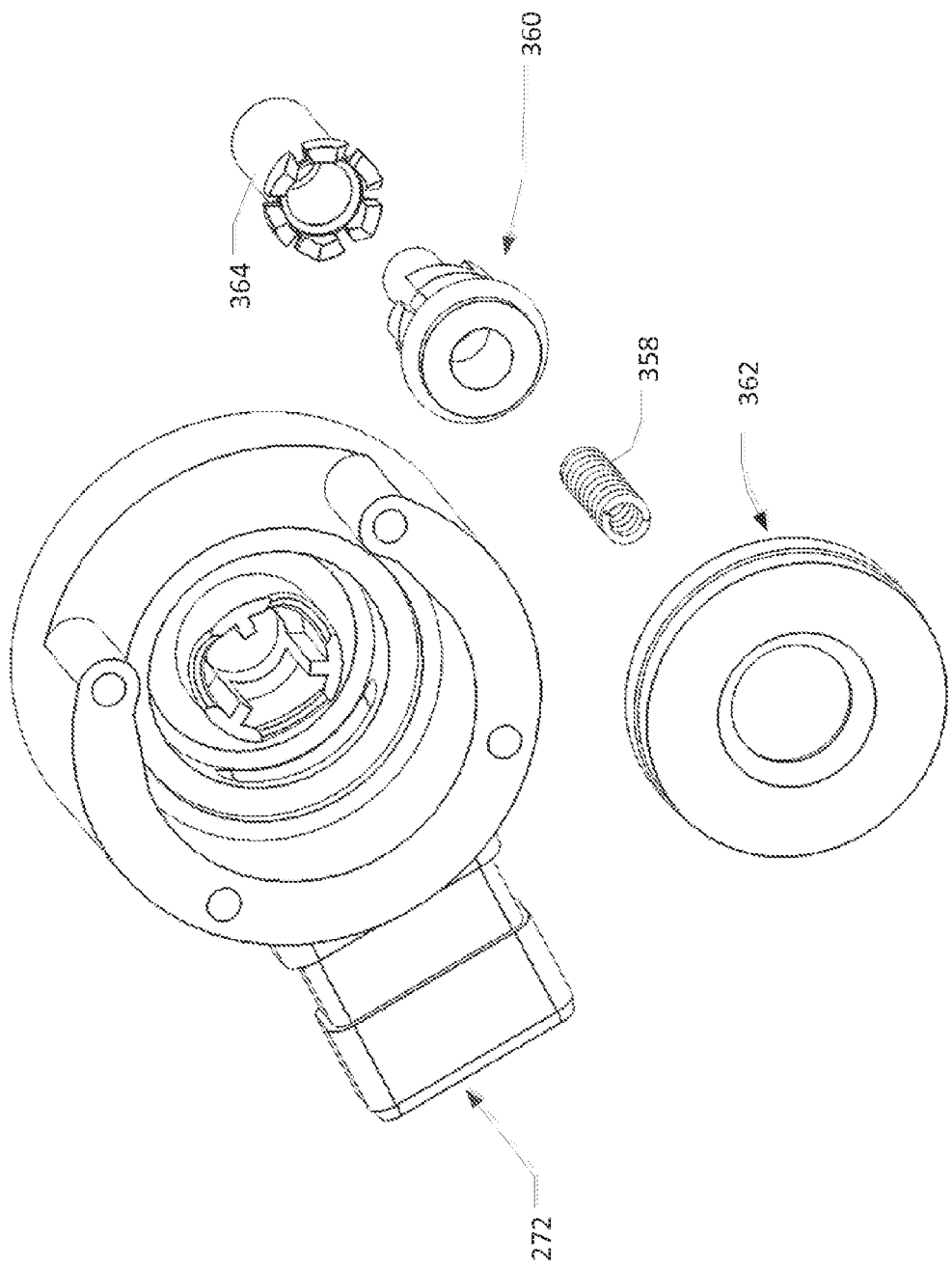
FIG. 16 illustrates a partially exploded view of components of a preferred washing glove.

FIG. 7 illustrates a subset of the components of FIG. 6; FIG. 8 illustrates a subset of the components of FIG. 7; FIG. 9 illustrates a partially exploded view of the components of FIG. 8; FIG. 10 illustrates a subset of the components of FIG. 9; FIG. 11 illustrates a partially exploded view of the components of FIG. 10; FIG. 12 illustrates a partially exploded view of components of a preferred washing glove when the seal component 360 is in the open position; FIG. 13 illustrates in cross-section the components of FIG. 12 but viewed from the opposite side; FIG. 14 illustrates a partially exploded view of components of a preferred washing glove when the seal component 360 is in the closed position; FIG. 15 illustrates in cross-section the components of FIG. 12 but viewed from the opposite side; and FIG. 16 also illustrates a partially exploded view of components of a preferred washing glove. The components collectively shown in FIGS. 7-16 include spring component 358; seal component 360; seal seating component 362; o-ring component 370; o-ring component 372; component 364; and button component 261.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A washing glove, comprising:
   (a) a sheath designed to be pulled onto the hand and extend along a portion of the forearm, the sheath having at least one thumb opening for extension of the thumb there through and at least one finger opening at a distal end of the sheath for extension of at least one finger therethrough;
   (b) at least one section of protuberances, the section including openings located in-between and around various protuberances for flow of water onto a pet being washed and scrubbed with the protuberances; and
   (c) an actuator for selectively actuating flow of water to and through the openings in the section of protuberances;
   (d) wherein the section of protuberances is located in an area for covering a palm of the hand, adjacent the thumb opening, and the actuator is located at a proximal end of the sheath in an area for covering a portion of a forearm;
   (e) wherein the sheath includes an area extending between the actuator and the section of protuberances that is designed to cover the wrist and permit flexibility of the hand at the wrist; and
   (f) wherein an externally located bridge spans the area between the actuator and the section of protuberances and defines a conduit through which water flows therebetween, the bridge spanning a wrist when the sheath is donned for use of the washing glove.

2. A washing glove, comprising:
(a) a sheath designed to be pulled onto the hand and extend along a portion of the forearm, the sheath having at least one thumb opening for extension of the thumb there through and at least one finger opening at a distal end of the sheath for extension of at least one finger therethrough;
(b) at least one section of protuberances, the section including openings located in-between and around various protuberances for flow of water onto a pet being washed and scrubbed with the protuberances; and
(c) an actuator configured to selectively actuate or deactivate the flow of water, the actuator comprising,
  (i) a button component configured to transition between a depressed state, in which the flow of water is enabled, and a non-depressed state, in which the flow of water is not enabled,
  (ii) a seal seating component comprising an opening defined therethrough,
  (iii) a seal component including,
    (A) a seal portion sized and dimensioned to correspond to the opening of the seal seating component, the seal component being configured to transition between,
      (I) a first position, in which the seal portion of the seal component blocks off the opening of the seal seating component, and
      (II) a second position, in which the seal portion of the seal component does not block off the opening of the seal seating component,
    (B) a shaft, and
    (C) a plurality of grooved faces arranged generally circumferentially about the shaft of the seal component,
  (iv) a spring component, and
  (v) another component comprising,
    (A) a shaft, and
    (B) a plurality of grooved faces arranged generally circumferentially about a shaft of the seal component,
  (vi) wherein the shaft of the seal component is sized and dimensioned to be received within the shaft of the other component, and wherein the plurality of grooved faces of the seal component and the plurality of grooved faces of the other component are sized and dimensioned to mate with one another such that, when engaged together, the two components are transitionable between
    (A) a first configuration, in which the shaft of the seal component is disposed within the shaft of the other component a first extent and the seal component is in the first position, and
    (B) a second configuration in which the shaft of the seal component is disposed within the shaft of the other component a second extent and the seal component is in the second position, the second extent being greater than the first extent,
    (C) wherein the spring component, which applies force to the seal component in a first direction parallel to the shafts of the two components, works in concert with the grooved faces of the two components to provide for transitioning between the first and second configurations upon application of force to the other component in a second direction parallel with the shaft of the two components, the second direction being opposite of the first direction,
  (vii) wherein the button component is coupled to the other component such that,
    (A) when the button is in its depressed state, pressing the button effects transitioning of the other component and the seal component collectively from their second configuration to their first configuration, in which first configuration the seal component is in its first position and the seal portion of the seal component blocks off the opening of the seal seating component, thereby cutting off the flow of water, and
    (B) when the button is in its non-depressed state, pressing the button effects transitioning of the other component and the seal component collectively from their first configuration to their second configuration, in which second configuration the seal component is in its second position and the seal portion of the seal component does not block off the opening of the seal seating component, thereby enabling the flow of water;
(d) wherein the section of protuberances is located in an area for covering a palm of the hand, adjacent the thumb opening, and the actuator is located at a proximal end of the sheath in an area for covering a portion of a forearm;
(e) wherein the sheath includes an area extending between the actuator and the section of protuberances that is designed to cover the wrist and permit flexibility of the hand at the wrist; and
(f) wherein an externally located bridge spans the area between the actuator and the section of protuberances and defines a conduit through which water flows therebetween, the bridge spanning a wrist when the sheath is donned for use of the washing glove.

3. The washing glove of claim 2, wherein the opening of the seal seating component is at least partially defined by contoured interior portions of the seal seating component.

4. The washing glove of claim 3, wherein the contoured interior portions of the seal seating component are configured for engagement with the seal portion of the seal component.

5. The washing glove of claim 4, wherein the seal seating component and the seal component are sized and dimensioned such that the water pressure of water prevented from flowing by the seal portion of the seal component is not sufficient to disrupt the prevention of water flow.

6. The washing glove of claim 2, wherein the seal seating component and the seal component are sized and dimensioned such that, when the two components are collectively in their second configuration, thereby enabling water flow, an unblocked area through which water can flow is generally of the same order of magnitude as the cross-sectional area of an inflow tube through which water is initially received at the washing glove.

7. The washing glove of claim 2, wherein the seal seating component comprises an o-ring.

8. The washing glove of claim 2, wherein the seal portion of the seal component comprises an o-ring.

9. A washing apparatus, comprising:
(a) at least one section of protuberances, the section including openings located in-between and around various protuberances for flow of water onto a pet being washed and scrubbed with the protuberances; and
(b) an actuator configured to selectively actuate or deactivate the flow of water, the actuator comprising,
  (i) a button component configured to transition between a depressed state, in which the flow of water is enabled, and a non-depressed state, in which the flow of water is not enabled, (ii) a seal seating component comprising an opening defined therethrough,
(iii) a seal component including,
  (A) a seal portion sized and dimensioned to correspond to the opening of the seal seating component, the seal component being configured to transition between
    (I) a first position, in which the seal portion of the seal component blocks off the opening of the seal seating component, and
    (II) a second position, in which the seal portion of the seal component does not block off the opening of the seal seating component,
  (B) a shaft, and
  (C) a plurality of grooved faces arranged generally circumferentially about the shaft of the seal component,
(iv) a spring component, and
(v) another component comprising,
  (A) a shaft, and
  (B) a plurality of grooved faces arranged generally circumferentially about a shaft of the seal component,
(vi) wherein the shaft of the seal component is sized and dimensioned to be received within the shaft of the other component, and wherein the plurality of grooved faces of the seal component and the plurality of grooved faces of the other component are sized and dimensioned to mate with one another such that, when engaged together, the two components can collectively be transitioned between,
  (A) a first configuration, in which the shaft of the seal component is disposed within the shaft of the other component a first extent and the seal component is in the first position, and
  (B) a second configuration in which the shaft of the seal component is disposed within the shaft of the other component a second extent and the seal component is in the second position, the second extent being greater than the first extent,
  (C) wherein the spring component, which applies force to the seal component in a first direction parallel to the shafts of the two components, works in concert with the grooved faces of the two components to provide for transitioning between the first and second configurations upon application of force to the other component in a second direction parallel with the shaft of the two components, the second direction being opposite of the first direction,
(vii) wherein the button component is coupled to the other component such that,
  (A) when the button is in its depressed state, pressing the button effects transitioning of the other component and the seal component collectively from their second configuration to their first configuration, in which first configuration the seal component is in its first position and the seal portion of the seal component blocks off the opening of the seal seating component, thereby cutting off the flow of water, and
  (B) when the button is in its non-depressed state, pressing the button effects transitioning of the other component and the seal component collectively from their first configuration to their second configuration, in which second configuration the seal component is in its second position and the seal portion of the seal component does not block off the opening of the seal seating component, thereby enabling the flow of water; and
(c) wherein an area extends between the actuator and the section of protuberances and an externally located bridge spans the area between the actuator and the section of protuberances and defines a conduit through which water flows therebetween.

10. The washing apparatus of claim 9, wherein the opening of the seal seating component is at least partially defined by contoured interior portions of the seal seating component.

11. The washing apparatus of claim 10, wherein the seal seating component and the seal component are sized and dimensioned such that the water pressure of water prevented from flowing by the seal portion of the seal component is not sufficient to disrupt the prevention of water flow.

12. The washing apparatus of claim 11, wherein the seal seating component and the seal component are sized and dimensioned such that, when the two components are collectively in their second configuration, thereby enabling water flow, an unblocked area through which water can flow is generally of the same order of magnitude as the cross-sectional area of an inflow tube through which water is initially received at the washing apparatus.

* * * * *